(No Model.)
S. M. PLUSH.
SAFETY DEVICE FOR ELECTRIC WIRES.
No. 254,099. Patented Feb. 21, 1882.
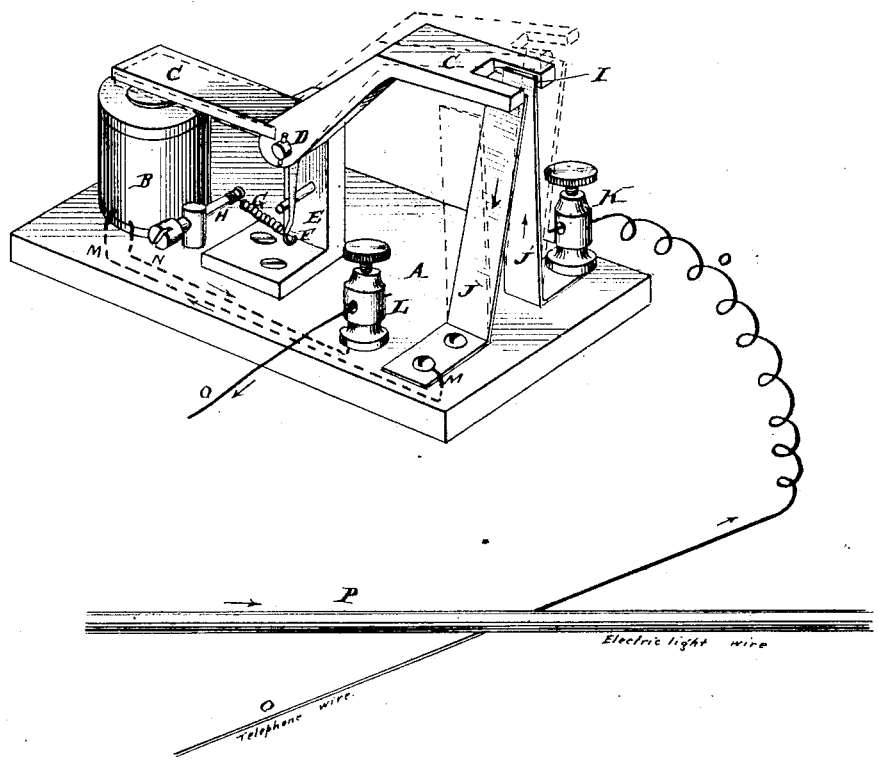
Attests
G. J. Harding
Wesley Williams
Inventor
Samuel M. Plush
By his atty

United States Patent Office.

SAMUEL M. PLUSH, OF PHILADELPHIA, PENNSYLVANIA, ASSIGNOR OF ONE-HALF TO HENRY BENTLY, OF SAME PLACE.

SAFETY DEVICE FOR ELECTRIC WIRES.

SPECIFICATION forming part of Letters Patent No. 254,099, dated February 21, 1882.

Application filed December 29, 1881. (No model.)

*To all whom it may concern:*

Be it known that I, SAMUEL M. PLUSH, of the city and county of Philadelphia, and State of Pennsylvania, have invented an Improvement in Automatic Safety-Keys for Electric Circuits, of which the following is a specification.

My invention relates to safety devices for telegraph and telephone or other wires adapted to conduct weak currents of electricity.

The object of this invention is to protect telephone and telegraph instruments and buildings in which they are placed, underground and submarine cables, against damage by fire when the circuits are overcharged from any cause; further, to protect operators whose business it is to handle said instruments. The source of electricity from which said circuits are liable to become overcharged is the conducting wires or cables for the electric light; and my invention consists in arranging in said circuits a device constructed as hereinafter set forth, which is inoperative in the weak currents in said wires, but is operative when said circuits become overcharged from any cause, and will open the circuit in which they are located, and thereby prevent all damage, both to the instruments and operators.

The drawing shows a perspective view of my improved safety apparatus.

A is the frame. B is an electro-magnet. C is an armature, pivoted to support E at D, and is provided on one end with a slot, I. This armature C is drawn away from the magnet B by a take-up screw, H, and spring G, which is secured to the arm F.

J and J' are springs which are secured to the frame A. The spring J' is electrically connected to a binding-post, K, and the other spring, J, is connected by wire M with the magnet B, and after passing around the core of said magnet the current is conducted to binding-post L by wire N. These binding-posts are connected to each end of the circuit O, which may be a telephone or telegraph wire.

P represents an electric-light wire and conveys a powerful current.

The armature C is drawn away from the magnet by spring F with a force greater than the attractive force of the magnet in its normal current, and the springs J J' are pressed together and placed between the prongs on either side of the slot I, as shown. Now, while the instruments in said line O are operating this instrument is inert, and the current passes in the direction indicated by the arrows. Now, suppose the electric-light wire P becomes electrically connected with wire O, the magnet instantly draws the armature C down, freeing the ends of the springs J J', which spring apart and open the circuit O, thereby preventing the powerful current from wire P passing down the circuit O to damage the instruments or injure the operators.

Having now described my invention, what I claim as new, and desire to secure by Letters Patent, is—

The springs J J', in combination with the forked pivoted armature C and magnet B, all forming parts of an electric circuit, and the spring G, which resists said magnet, whereby a weak current of electricity is allowed to pass in said circuit for telephonic or other purposes, but a dangerously-strong current causes the magnet B to overcome the resistance of spring G and draw one end of the armature down, so as to free said springs from the other end, and thereby break the current.

In testimony of which invention I hereunto set my hand.

SAMUEL M. PLUSH.

Witnesses:
R. M. S. SMITH,
R. S. CHILD, Jr.